United States Patent [19]
Hulsemann

[11] 4,006,598
[45] Feb. 8, 1977

[54] BREAKWATER SYSTEM

[76] Inventor: Jobst Hulsemann, 1041 Avenida Amantea, La Jolla, Calif. 92037

[22] Filed: Nov. 24, 1975

[21] Appl. No.: 634,939

[52] U.S. Cl. .......................................... 61/3; 61/4
[51] Int. Cl.² .................................... E02B 3/04
[58] Field of Search ............... 61/2, 3, 4, 5, 1, 37

[56] References Cited
UNITED STATES PATENTS

| | | | |
|---|---|---|---|
| 2,584,867 | 2/1952 | Guarin | 61/5 |
| 2,920,454 | 1/1960 | Wolf | 61/4 |
| 3,830,066 | 8/1974 | Larsen | 61/3 |
| 3,848,419 | 11/1974 | Bowley | 61/5 |

*Primary Examiner*—Jacob Shapiro
*Attorney, Agent, or Firm*—Fulwider Patton Rieber Lee & Utecht

[57] ABSTRACT

A breakwater system comprising a generally plate-like structure disposed offshore and having an upper face which defines a raised sea floor above the natural bottom. Incoming waves are crested offshore over the breakwater where there is little or no damage caused by the cresting and subsequently formed waves are smaller because of the reduced water depth afforded by the false sea floor of the breakwater. Open spaces are provided in the upper face of the breakwater so that water pressure on the breakwater is equalized thereby minimizing the structural requirements of the breakwater. A plurality of false sea floors, each disposed at a different distance from the natural bottom may be utilized in forming the breakwater system of the invention. Because the breakwater is raised off the bottom there is no interference with the normal tidal and other near shore currents.

12 Claims, 7 Drawing Figures

SHORE

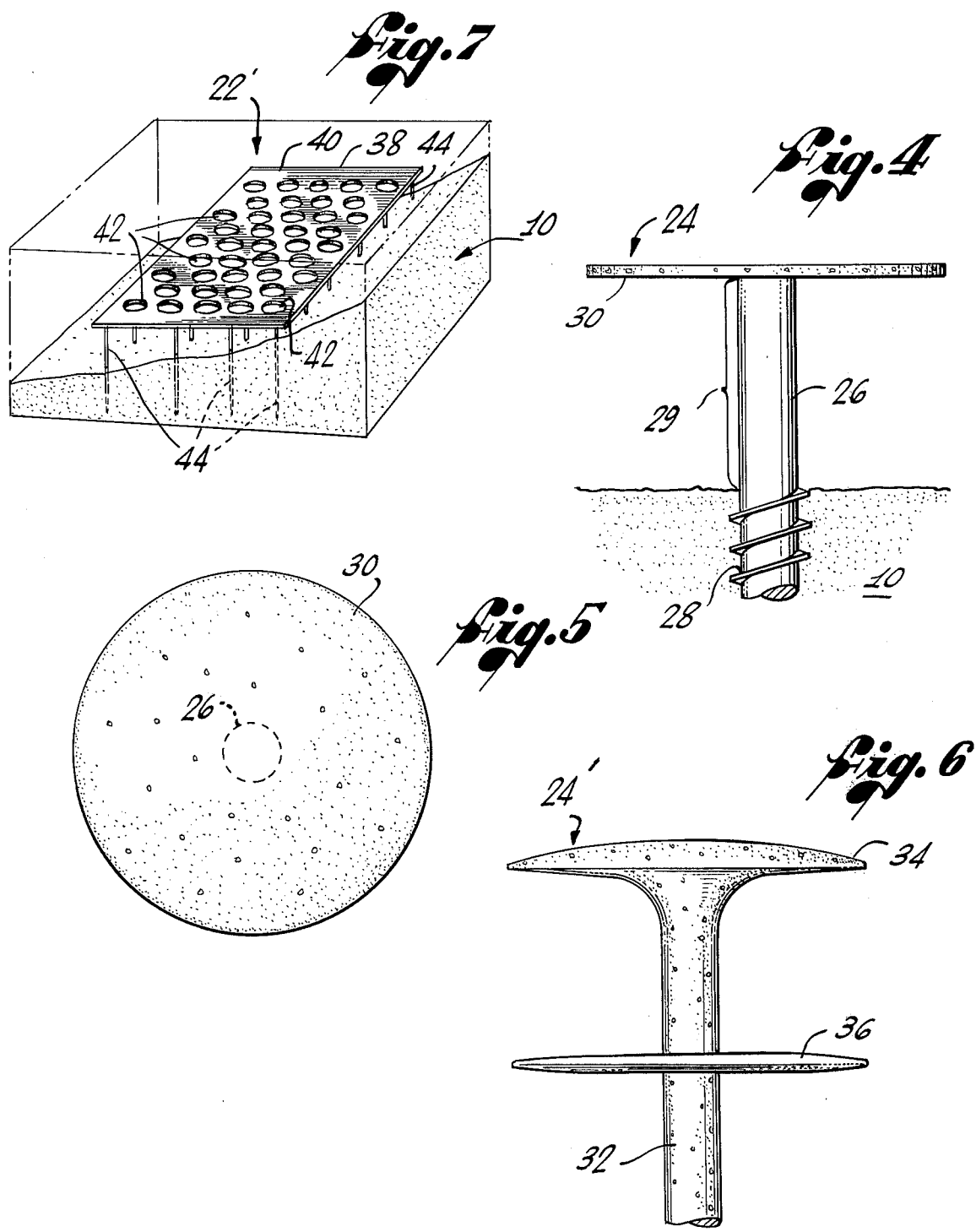

BREAKWATER SYSTEM

BACKGROUND OF THE INVENTION

This invention relates to breakwaters and more particularly to an improved breakwater system for damping incoming wave energy to reduce harmful effects of incoming waves on the bottom, adjacent shore and the like.

The use of the breakwaters for the protection of shore area and the damping of incoming wave action is well known in the art. The most common breakwater is the barrier type which is in effect a solid wall situated offshore extending from the bottom to above the air water interface. This type of breakwater acts as a wall against which the energy of the incoming waves is expended so that the water area on the landward side of the breakwater remains relatively calm and the shore area is relatively protected against battering and erosion by wave action. This type of breakwater by its very nature interferes with normal currents which, under the proper circumstances, can result in increased erosion at the margins of the breakwater and may result in undue silting on the leeward side of the breakwater. In addition, breakwaters of this type require constant care and maintenance because of the force of the incoming waves and because the normal currents acting against the breakwater will in time erode away the base of the breakwater which will result in damage to the breakwater.

Other types of breakwaters have been devised in an attempt to avoid the massive construction generally required for barrier type breakwaters. These are normally of the floating barrier type in which a buoyant body or plurality of buoyant bodies acting at the air-water interface serve to dampen the wave height, thereby to produce an area of relatively calm water behind the breakwater. Although such devices may operate satisfactory in moderate seas, they are normally of insufficient strength to withstand very heavy seas, particularly in shallow water where wave action is most severe and it can be expected that substantial repair and replacement of the buoyant bodies will be required after a period of heavy seas. In addition such devices require relatively complex mooring systems to retain the floating breakwater in position.

The present invention overcomes the foregoing deficiencies with the prior art devices and provides a breakwater system effective for damping incoming waves without interferring with normal tidal and offshore currents.

SUMMARY OF THE INVENTION

The present invention resides in a breakwater system designed to act beneath the air-water interface at the base of incoming waves to reduce the height of the waves and thereby reduce the energy components of incoming waves. By acting beneath the air-water interface, the device of the present invention is subjected to lower physical stresses as a result of wave encounter. Accordingly, the structural strength of the system is not as critical as for prior art devices which encounter the incoming waves at the air-water interface, the point of greatest wave energy.

In accordance with the present invention, the breakwater system includes a generally plate-like structure having a substantially planar upper face spaced above the natural bottom to define a false sea floor over which the depth is substantially reduced as contrasted to depth of water over the natural bottom. Incoming waves, the sustainable heights of which are a function of water depth, pass over the breakwater and are reduced in height because of the shallowness of the water over the breakwater. Waves subsequently formed over the breakwater are likewise substantially reduced in size. Because of the shallowness of the water, the waves reaching shore have less force than would be the case without the breakwater.

The upper face of the plate-like structure is provided with a plurality of spaced apart apertures or open areas which extend through the structure to permit the passage of water therethrough, thus equalizing pressure above and below the structure. Because of the pressure equalization feature and because the breakwater acts substantially at the wave base rather than at the air-water interface, the stress on the breakwater is minimized. Consequently, damage to the breakwater by wave action is minimal, and little or no maintenance is required. In addition, the plate-like structure of the breakwater is spaced above the natural bottom so that there is substantially no interference with the normal tide and other near shore currents as a result of the placement of the breakwater.

In one embodiment of the invention, the breakwater system defines a generally rectangular shaped sheet or plate in which a plurality of apertures or open spaces are provided so that about 50 to about 80% of the plate upper face is solid. The breakwater is disposed with the plate spaced above the seabottom in a generally horizontal plane and anchored by a plurality of posts directly in the natural bottom.

The breakwater is positioned offshore adjacent the area to be protected and normally extends in its longitudinal dimension parallel to the area to be protected. The transverse dimension of the breakwater, that is the distance from the landward to the seaward edges, is equal to at least 1½ wavelengths.

In another embodiment of the invention, the breakwater system is defined by a plurality of generally disk shaped elements which are disposed above the natural sea bottom and in combination define a generally rectangular plate-like configuration. The upper surfaces of the disks comprise a substantially planar upper face and the size of the disks and the spacing therebetween is such that not more than about 80% of the upper face area is solid surface. The combination of disks is so arranged as to transversely extend a distance of at least about 1½ wavelengths. The size of the disks and the spacing therebetween can be varied across the transverse dimension of the breakwater, so that on the seaward side a more open surface is presented to the incoming waves while on the landward side a more dense surface is presented. In this manner, the seaward edge portion of the breakwater, which is encountering waves having the greatest energy, is subjected to less stress as a result of its encounter with the wave base. On the landward side, however, the denser surface is presented to waves of lower energy, and thus provides the greatest amount of wave damping. The disks may be arranged in vertically spaced tiers so as to provide false sea floors at different distances from the natural bottom.

Other features and advantages of the present invention will become apparent from the following detailed description taken in conjunction with the drawings and from the appended claims.

BRIEF DESCRIPTION OF THE DRAWINGS

FIG. 4 is a side elevation of an individual disk element of the breakwater of FIG. 3 showing the disk element secured in its operating position in the sea bottom;

FIG. 5 is a plan view of the disk element of FIG. 4;

FIG. 6 is a side elevation of a disk element carrying two disks with a portion of the shaft of the disk element broken away for compactness of illustration; and FIG. 7 is a perspective view, partially in section, of a breakwater constructed in accordance with another embodiment of the invention.

DESCRIPTION OF THE INVENTION

Figure 1:
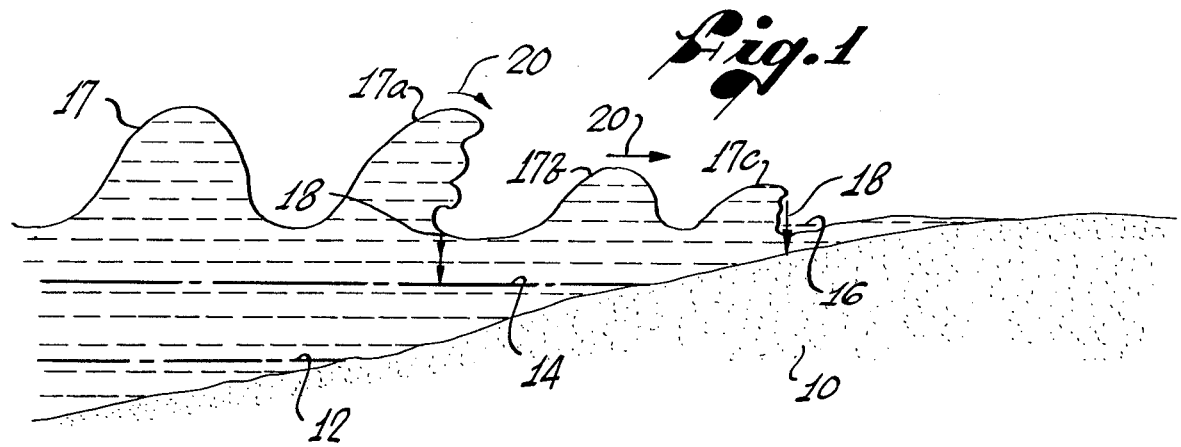
FIG. 1 is a sectional side elevation illustrating schematically a section of sea floor and the action of incoming waves.

As shown in FIG. 1 a section of typical seabottom 10 adjacent a shore area is covered by water which normally cycles, because of tides, between a median low water level 12 and a median high tide level 14. During storms, however, the water may reach an even greater level and this level is designed as the median storm level 16.

As used herein the term "natural high water level" designates the mean high water level, such as that reached during a storm at high tide. It should be clear, however, that a specific water level cannot be precisely defined because of the variations in frequency and intensity of storms, the geography of the shore area, the nature of the body of water and other factors. Accordingly, determination of the natural high water level as well as the median low water level 12 and median high tide level 14 can only be made after a period of observation and collection of data at the location.

Incoming waves 17, generally generated by wind, can occur at any of the aforementioned water levels. These incoming waves, upon reaching the shallow waters adjacent the shore, break or crest and, depending upon the wave height, may result in erosion of the bottom. In addition, the battering force of the wave, that is the force of the wave applied in a generally horizontal plane, is also largely dependent upon the height of the incoming waves.

Wave height is a factor of both wind velocity and water depth and as the incoming wave 17 approaches the shore, the water depth decreases to a point where the wave height is greater than the water depth can support. As water depth decreases, the front of the wave 17 becomes increasingly steeper until the wave collapses which results in the cresting or breaking of the wave, as indicated in 17a. It is presently believed that cresting will occur when the height of the wave, that is, the vertical distance from the trough to the crest of the wave, exceeds about 1.5 times the mean depth of the water. Cresting of the wave creates a vertical component of energy 18 due to falling water and the magnitude of the vertical component is related to wave height. If the water is shallow enough and the vertical component 18 sufficiently large, particles from the bottom 10 will be lifted and suspended in the water, where they are eventually carried away by tidal current, or near shore currents, if present, and subsequently deposited as silt.

In addition to the vertical energy component 18, a horizontal energy component 20, which is also related to wave height, is generated by the incoming wave 17, which accounts for the battering force of the wave. The horizontal component 20 is greatest at the air-water interface or surface of the wave 17.

After cresting, as at 17a, new wave forms 17b are generated and cresting is repeated, as at 17c. The new wave form 17b is reduced in height as constrasted to the parent wave 17, because they are formed over shallower water. However, the new wave forms even though of reduced height may still have sufficient vertical and horizontal energy components to be destructive to shore areas and installations located therealong.

In accordance with the present invention, it has been found that by raising the sea bottom and reducing the water depth in a selected offshore area, incoming waves are caused to crest offshore in an area where the vertical component 18 can do little or no erosive damage to the sea bottom 10. The breakwater system of the present invention is so constructed as to not interfere with normal tidal and near shore currents, and is disposed in the water for acting adjacent the base of the wave, where both the vertical component 18 and the horizontal 20 of wave energy are lower. Therefore, the breakwater system of the present invention is not exposed to the full force of the incoming waves 17 and structural damage and resultant maintenance requirements are far less than would ordinarily be required for a conventional breakwater of either the barrier type or buoyant body type.

Figure 2:
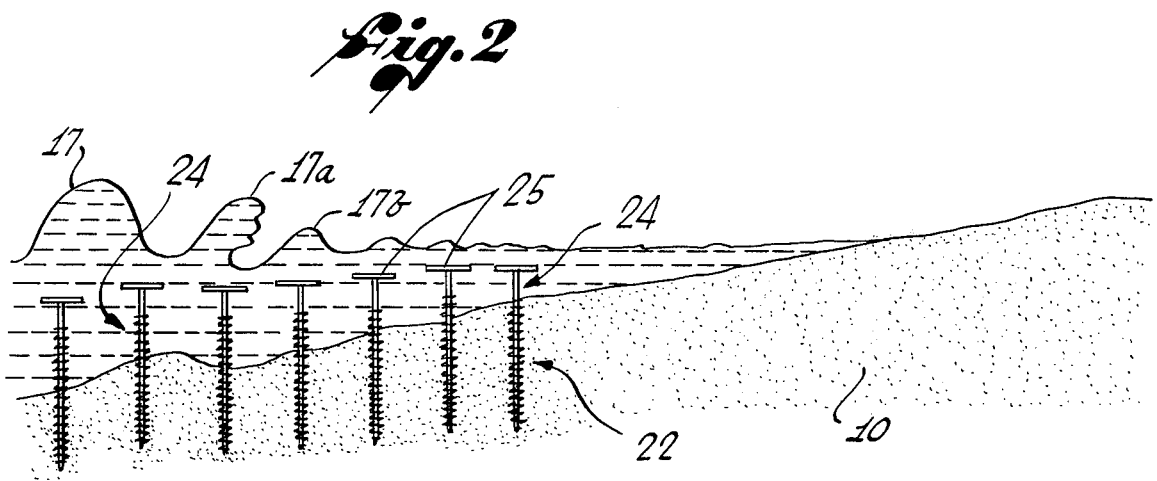
FIG. 2 is a side sectional view of the sea floor of FIG. 1 and showing a breakwater, constructed in accordance with the invention disposed on the seabottom for damping incoming waves.
Figure 3:
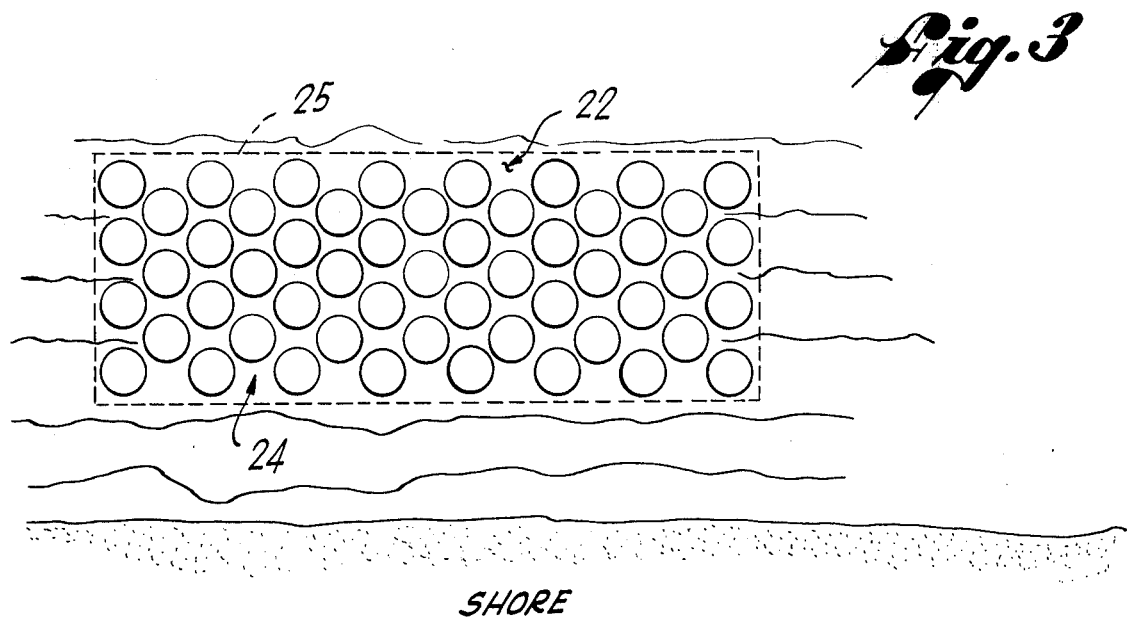
FIG. 3 is a plan view of the breakwater of FIG. 2.

As is more particularly shown in FIGS. 2 and 3, a breakwater system, shown generally as 22, comprises a plurality of individual disk units 24 which are arranged in spaced relation off the shore area to be protected. The disk units are arranged to define a generally elongated plate-like structure having a substantially planar upper face 25, which is spaced above the bottom 10 to define a false sea floor which acts on the incoming waves in the same manner as the natural sea bottom in shallower waters adjacent the shore. Thus, as the incoming waves 17 pass over the upper face 25 of the breakwater system 22 the mean depth of the water is substantially decreased, and should the wave height be in excess of about 1.5 times the mean depth of the water as now determined by the upper face of the breakwater 22, the wave will crest as at 17a. Subsequently formed waves will be of substantially reduced heights so that waves eventually reaching the shore area are of reduced force.

The breakwater system 22 is preferably located in the offshore waters with its longitudinal axis extending substantially parallel to the shoreline or to the installation being protected. The precise offshore distance of the breakwater system 22 is not critical although it is highly preferred to locate it far enough offshore so that the cresting waves 17a which are induced by the breakwarter system 22 will have substantially little or no effect on the sea bottom 10. The breakwater system 22 is spaced above the sea bottom 10 so that the upper face 25 will lie substantially in a horizontal plane vertically spaced from the bottom 10. The upper face 25 may be located with respect to natural bottom so as to lie between substantially the low water level 12 and the natural high water level, for example the storm level 16. In this connection it is often preferred to employ several horizontally staggered tiers of the breakwater system 22 such as, for example, three systems spaced outwardly from the shore with the upper face 25 of the system most remote from the space being located substantially at the low water level 12, the next system located substantially at the high tide level 14 and the system closest to the shore located substantially at the storm level 16. As will be discussed below, the individual disk units 24 may also define several vertically aligned levels so that a single installation will present upper surfaces 25 at the various water levels. Although the upper face 25 of the system 22 is described as substantially planar, the upper faces can be contoured in conformity with the contour of the bottom 10 at the point of installation.

The longitudinal dimension of the breakwater system 22 is not critical and it may be as long as required to protect a particular shore area or installation. The transverse dimension of the system 22 is selected as to be equal to at least 1½ wavelengths and preferably the transverse dimension is equivalent to three or more wavelengths. As used herein, a wavelength will vary depending upon the location, the depth of the body of water, the slope of the sea bottom and the like. Thus, for example, in North Sea locations the wavelengths is relatively short, while on the West Coast of the United States wavelengths are generally longer.

As is more particularly shown in FIGS. 4 and 5, the disk units 24 each comprise a shaft or pile 26, including a lower threaded end portion 28, adapted for securement in the sea bottom 10, and an upper end portion 29 extending above the sea bottom and carrying a disk 30 in spaced relation to the sea bottom. The upper surface of the disk 30 in combination with adjacent disks define the upper face 25 of the breakwater system 22, which acts on the wave in the manner described to induce early cresting, thereby substantially reducing the vertical factor 18 and the horizontal factor 20 of the incoming wave 17. The disk 24 are preferably constructed of a fairly high strength material and in this connection reinforced concrete has been found to be an excellent construction material in view of its high strength and ready availability. With reinforced concrete it has been found that the preferred proportions of the disk 30 diameter to the diameter of the pile 26 to the length of the extending portion of the pile be maintained on the order of about 7:1:3.5. It is also preferred that the portion of the pile 26 in the sea bottom 10 be twice the length of the extending portion to insure proper anchoring of the disk unit 24. As previously mentioned the disk 30 is disposed substantially at the level of one of the water marks and therefore the length of the extending portion should at least be equal to the distance between the the sea bottom and the desired water mark.

The spacing between the individual disk units 24 is an important element of the present invention, since, if the units are spaced too far apart, the efficiency of the breakwater system 22 is reduced. On the other hand, if the units are spaced too closely together, the breakwater system 22 will be exposed to undue structural stress due to the force exerted by the water passing over the breakwater system. Accordingly, it has been found that good results are achieved when the units are spaced so that the upper surfaces of the disks 30 comprise between about 50 to about 80% of the total area of the upper face 25 of the breakwater system 22. In this manner sufficient surface is provided to efficiently reduce the height of the wave yet sufficient open space is provided to permit equalization of the pressures on the system 22. It should be pointed out, however, that the disk units 24 need not be equally spaced apart and in this connection greater spacing between the disk units 24 on the seaward side of the system 22 can be advantageous where the largest waves will be encountered. The spacing can then be reduced in the transverse direction toward the landward side of the system 22 to achieve maximum damping efficiency.

As already discussed, in many cases it is desirable to provide a series of breakwater system 22, in which the upper faces 25 are disposed at different heights from the sea bottom 10, so that, for example, the face of one system lies substantially at the low water mark 12 and the upper face of another system is disposed at the higher water mark 14. If desired, however, a single breakwater system 22 can be provided with several vertically aligned upper faces 25 which are disposed at different distances from the bottom.

As is more specifiically shown in FIG. 6, a disk unit 24' includes a shaft or pile 32, the upper end of which carries a disk 34 and a second lower disk 36 which is spaced intermediate the shaft 32. Thus, when affixed to the sea bottom 10 in the manner already described, the upper disk 34 is disposed, for example, at the high water mark 14, while the second lower disk 36 is spaced on the shaft 32 so as to be disposed at the low water mark 12. When the individual units 24' are disposed in spaced relation with adjacent units to define the breakwater system 22, that system is provided with a first upper substantially planar upper face 25 at the high water mark 14 and a second lower planar face disposed vertically below the first face at the low water mark 12. The system 22 operates to cause early cresting of the wave at both the low water mark 12 and the high water mark 14 in the same manner as previously described in connection with the system illustrated in FIGS. 2 and 3. A third disk can be added to the disk unit 24' so the system 22 includes faces 25 at the low water mark 12, the high water mark 14 and the mean storm level 16.

Although the breakwater system of the present invention has been described in connection with a pluarlity of disk units 24 which are individually anchored in the sea bottom 10 to define a false sea floor, it should be clear that other structural arrangements can be utilized to induce the early cresting of waves in accordance with the present invention. For example, a platform unit can be utilized in place of the plurality of disk units 24.

As is more specifically shown in FIG. 7, a breakwater system 22' comprises a unitary rectangular platform 38 having a substantially planar upper face 40 including a plurality of openings 42, which extend through the platform for the equalization of pressure. The platform 38 is anchored on the sea bottom 10 by a plurality of piles 44 which extend above the sea bottom for carrying the platform 38 substantially at one of the water marks for the purpose already described. The openings 42 are distributed over the platform 38 and are of sufficient size and number so that the solid portion of the discontinuous surface of the platform comprises between about 50 to about 80% of the total platform area. The transverse dimension of the platform 38 is equal to between about 1½ to about three wavelengths. In this embodiment, the breakwater system 22' can comprise sections of the platforms 38 arranged in end to end relation so as to extend parallel to the shoreline or installation being protected.

The operation of the breakwater system 22' is as described above. That is to say, the upper surface 40 of the platform 38 defines a false sea floor, which causes early cresting of the larger incoming waves, while waves subsequently formed over the system are substantially smaller because of the reduced water depth provided by the false sea floor.

From the foregoing it will be seen that the breakwater system of the present invention provides a false sea floor, which is in spaced relation to the natural sea bottom, to act upon the base portions of incoming waves to induce early creasting of incoming waves at a point offshore, where the vertical component of wave energy can do substantially little or no damage to the sea bottom. The transverse dimension of the system is sufficiently large to inhibit the subsequent formation of large waves over the system. The waves that formed over the breakwater are of substantially less height than would be normally formed in the absence of the breakwater and the horizontal component and the vertical components of wave energy are greatly reduced on the landward side of the breakwater system. In view of the structural design of the breakwater system and the manner in which it acts on the incoming waves, the forces exerted on the system are minimized. Moreover, since the breakwater is raised above the sea bottom, there is substantially no interference with normal currents.

While the invention has been described above in connection with certain embodiments thereof, it will be clear that changes and modifications may be made to the breakwater system of the present invention without departing from the spirit or the scope of the appended claims.

I claim:

1. An off-shore breakwater structure for damping the energy of incoming waves to prevent damage and erosion along a shoreline comprising an array of separate, unconnected, rigid, non-buoyant, stationary, disc-shaped, horizontal, spaced-apart platforms each supported above the natural sea floor by a single, centered, vertical pile, said platforms being arranged according to a predetermined regular pattern such that the area of the platforms covers between about 50 and 80 percent of the area of the array, thereby forming a false sea floor that induces early cresting of waves while equalizing the water pressure above and below said false sea floor.

2. The breakwater structure of claim 1, wherein the spaces between said platforms varies according to the distance of the platforms from the shoreline, the most seaward platforms being spaced-apart by the greatest distances.

3. The breakwater structure of claim 1, wherein the transverse dimension of the array is at least about 1.5 wavelengths.

4. The breakwater structure of claim 1, wherein the transverse dimension of the array is about three wavelengths.

5. The breakwater structure of claim 1, wherein the upper face of each platform is substantially planar.

6. The breakwater structure of claim 1, wherein the platforms are arranged in a plurality of vertically spaced tiers.

7. The breakwater structure of claim 1, wherein the platforms are arranged in at least three vertically spaced tiers, the tier most remote from the shoreline being located substantially at the low tide level, another tier being located substantially at the high tide level, and the tier closest to the shoreline being located substantially at the storm level.

8. The breakwater structure of claim 1, wherein the ratio of the diameter of each platform to the diameter of its supporting pile to the length of the pile exposed above the natural sea floor is about 7:1:3.5.

9. The breakwater structure of claim 1, wherein the platforms are made of reinforced concrete.

10. An off-shore breakwater structure for damping the energy of incoming waves to prevent damage and erosion along the shoreline comprising an array of stationary, unconnected, disc-shaped, rigid, non-buoyant, horizontal, spaced-apart, reinforced concrete platforms having substantially planar upper faces, each platform being supported above the natural sea floor by a single, rigid, vertical pile, the ratio of the diameter of each platform to the diameter of its supporting pile to the length of the pile exposed above the natural sea floor being about 7:1:3.5, said platforms being arrayed along the shoreline with the area of the platforms covering between about 50 and 80 percent of the area of the array, the distance between said platforms being varied in accordance with the distance from the shoreline such that the most seaward platforms are spaced-apart by the greatest distance, said array forming a false sea floor that induces early cresting of waves while equalizing the water pressure above and below the false sea floor.

11. The breakwater structure of claim 10, wherein the platforms are arranged in a plurality of vertically spaced tiers.

12. The breakwater structure of claim 10, wherein the platforms are arranged in at least three vertically spaced tiers, the tier most remote from the shoreline being located substantially at the low tide level, another tier being located substantially at the high tide level, and the tier closest to shoreline being located substantially at the storm level.

* * * * *